United States Patent [19]

Bloch

[11] 3,914,271

[45] Oct. 21, 1975

[54] BIODEGRADABLE SULFATE DETERGENTS
[75] Inventor: Herman S. Bloch, Skokie, Ill.
[73] Assignee: Universal Oil Products Company, Des Plaines, Ill.
[22] Filed: Dec. 4, 1974
[21] Appl. No.: 529,317

Related U.S. Application Data
[63] Continuation-in-part of Ser. No. 277,837, Aug. 3, 1972, Pat. No. 3,867,432.

[52] U.S. Cl. ............................. 260/458; 252/549
[51] Int. Cl.² ..................................... C07C 141/02
[58] Field of Search ................................. 260/458

[56] References Cited
UNITED STATES PATENTS
3,168,555  2/1965  Clippinger et al. ............... 260/503

*Primary Examiner*—Bernard Helfin
*Assistant Examiner*—A. Siegel
*Attorney, Agent, or Firm*—James R. Hoatson, Jr.; Raymond H. Nelson; William H. Page II

[57] ABSTRACT

Novel compositions of matter which are useful as biodegradable detergents comprise alkali metal disubstituted cyclohexyl sulfates. The compounds, as exemplified by sodium(n-octylcyclohexyl)methano sulfate, are prepared by condensing butadiene with allyl chloride, hydrogenating the ring, thereafter ring alkylating with an olefin in the presence of a free-radical generating compound and reacting the disubstituted cyclohexane with an alkali metal salt of a sulfur-containing compound to form the desired product.

6 Claims, No Drawings

BIODEGRADABLE SULFATE DETERGENTS

CROSS-REFERENCE TO RELATED APPLICATIONS

This application is a continuation-in-part of my copending application Ser. No. 277,837 filed Aug. 3, 1972, now U.S. Pat. No. 3,867,432 all the teachings of which are specifically incorporated herein by reference thereto.

This invention relates to novel compositions of matter and also to a process for preparing these compounds which are useful as biodegradable detergents. More specifically, the invention is concerned with these compounds comprising alkali metal salts of disubstituted cyclohexane sulfates which are biodegradable in nature when formed.

One of the major problems which is prevalent in population centers throughout the world is the disposal of sewage containing detergents dissolved therein. Such disposal problems are especially trying in the case of branch chained alkylaryl detergents. These detergents produce stable foams in hard or soft waters in such large quantities that the foam clogs sewage treatment facilities, and destroys the bacteria which are necessary for proper sewage treatment. In many rivers, streams, lakes, etc., which act as a water supply for the aforesaid population centers, there are found these unwanted foams and suds. As hereinbefore set forth, the presence of these unwanted foams or suds is due in many instances to the use of detergents which are non-biodegradable in nature and which will not break down by bacterial action thereon. The non-biodegradable nature of these detergents is due to the fact that the alkyl side chain of the molecule is in many instances highly branched and therefore not readily attacked by the organisms which would ordinarily destroy the molecule. In contradistinction to this, the use of straight chain alkyl substituents on the ring will permit the detergents to be destroyed and therefore foams or suds will not build up on the surface of the water.

It is therefore an object of this invention to provide a novel method for the manufacture of biodegradable detergents which may be degraded in both urban and rural sewage disposal systems.

A further object of this invention is to provide novel compositions of matter comprising biodegradable detergents.

In one aspect an embodiment of this invention resides in a novel biodegradable detergent having the formula:

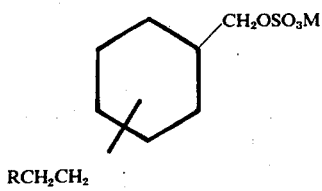

in which M is an alkali metal and R is an alkyl group of from 1 to about 14 carbon atoms.

A specific embodiment of this invention is found in a biodegradable detergent such as sodium(n-octylcyclohexyl)methano sulfate.

Other objects and embodiments will be found in the following further detailed description of the present invention.

As hereinbefore set forth the present invention is concerned with novel compositions of matter and to a process for the preparation of these compounds which are useful as biodegradable detergents, the process being effected in a series of steps. In the first step of the reaction butadiene is reacted with allyl chloride in a Diels-Alder type condensation to give 4-chloromethylcyclohexene. Homologs of butadiene, such as isoprene or analogous cyclic conjugated dienes such as cyclopentadiene or cyclohexadiene may be used instead of butadiene, and these yield generally similar results, but butadiene is preferred. The Diels-Alder condensation is effected at elevated temperatures usually in the range of from about 50° to about 190° C. and at a pressure ranging from atmospheric up to about 100 atmospheres. The reaction pressure may be attained by the introduction of a substantially inert gas such as nitrogen or argon into the reaction zone, the amount of pressure which is utilized being that which is sufficient to maintain at least a portion of the reactants in the liquid phase.

The 4-chloromethylcyclohexene which is formed according to the above paragraph is then subjected to a hydrogenation step. The chloromethylcyclohexene is selectively hydrogenated in the presence of a noble metal catalyst, these hydrogenation catalysts being well known in the art. Specific examples of these catalysts will include, in particular, platinum and palladium compounds per se or composited on a solid support which is essentially non-acidic in character, examples of these supports being charcoal or kieselguhr. The hydrogenation reaction is effected at hydrogenation conditions which will include a temperature in the range of from about −25° to about 50° C. and at an applied hydrogen pressure which may range from 50 to about 2000 pounds per square inch whereby the chloromethyl substituent remains unchanged, while the cyclohexene ring is hydrogenated to form a cyclohexane ring. Thereafter the chloromethylcyclohexane is subjected to ring alkylation by reaction with an alpha-olefin in the presence of a free-radical generating compound and hydrogen chloride. In an alternative variation of this procedure, the hydrogenation of the ring unsaturation may be carried out after the alkylation of the chloromethylcyclohexene, i.e., the hydrogenation may be effected on the resultant n-alkyl-substituted chloromethylcyclohexene.

The chloromethylcyclohexane which has been obtained according to the process set forth in the above paragraph is then selectively alkylated utilizing an olefinic hydrocarbon as the alkylating agent. The selective alkylation in which the alkyl substituent is positioned on the ring rather than on the side chain is effected by treating the reactants in the presence of a free-radical generating compound and hydrogen chloride. In the preferred embodiment of the invention the olefinic hydrocarbon which is utilized as the alkylating agent will comprise an alpha-olefin containing from 3 to about 20 carbon atoms. By utilizing an alkylation catalyst comprising a free-radical generating compound and a promoter comprising hydrogen chloride, it is possible to obtain a normal alkyl side chain on the cyclohexane ring rather than a secondary alkyl side chain which would result if the alkylation were effected in the presence of an acidic catalyst of the Friedel-Crafts type or sulfuric acid, etc. Specific examples of these olefinic hydrocarbons which are utilized as the alkylating agents include 1-hexene, 1-heptene, 1-octene, 1-nonene, 1-decene, 1-undecene, 1-dodecene, 1-tridecene, 1-tetradecene, etc. It is also contemplated within the scope of this invention that other alpha-olefins containing less than 6 or more than 14 carbon atoms may also be utilized, said olefins including propene, 1-butene, 1-pentene, 1-pentadecene, 1-hexadecene, 1-heptadecene, 1-octadecene, 1-nonadecene, 1-eicosene, etc.

The catalysts which are used in this step of the invention will include peroxy compounds, containing the bivalent radical —O—O—, which decompose to form free radicals which initiate the general reaction and are capable of inducing the condensation of the chloromethylcyclohexane with the 1-alkene. Examples of these catalysts include the persulfates, perborates, percarbonates of ammonium and of the alkali metals, or organic peroxy compounds. The organic peroxy compounds constitute a preferred class of catalysts for use in the invention and include peracetic acid, persuccinic acid, methyl ethyl ketone peroxide, methyl isobutyl ketone peroxide, acetyl peroxide, dipropionyl peroxide, di-t-butyl peroxide, butyryl peroxide, lauroyl peroxide, benzoyl peroxide, tetralin peroxide, urea peroxide, t-butyl perbenzoate, t-butyl hydroperoxide, methylcyclohexyl hydroperoxide, cumene hydroperoxide, diisopropylbenzene hydroperoxide, etc. Mixtures of peroxy compound catalysts may be employed or the peroxy compound catalyst may be utilized in admixture with various diluents. Thus, organic peroxy compounds which are compounded commercially with various diluents which may be used include benzoyl peroxide compounded with calcium sulfate, benzoyl peroxide compounded with camphor, phthalate esters, etc. Only catalytic amounts (less than stoichiometric amounts) need be used in the process.

The alkylation of the chloromethylcyclohexane with the 1-alkene is effected at elevated reaction temperatures which should be at least as high as the initial decomposition temperature of the free-radical generating catalyst, such as the peroxide compound, in order to liberate and form free radicals which promote the reaction. In selecting a particular reaction temperature for use in the process of the present invention, two considerations must be taken into account. First sufficient energy by means of heat must be supplied to the reaction so that the reactants, namely, the chloromethylcyclohexane and the 1-alkenes will be activated sufficiently for condensation to take place when free radicals are generated by the catalyst. Second, free-radical generating catalysts such as peroxy compounds, particularly organic peroxides, decompose at a measurable rate with time in a logarithmic function dependent upon temperature. This rate of decomposition can be and ordinarily is expressed as the half life of a peroxide at a particular temperature. For example, the half life in hours for di-t-butyl peroxide is 11 hours at 125° C., 4 hours at 135° C., and 1.5 hours at 145° C. A reaction system temperature must then be selected so that the free-radical generating catalyst decomposes smoothly with the generation of free radicals at a half life which is not too long. In other words, sufficient free radicals must be present to induce the present chain reaction to take place, and these radicals must be formed at a temperature at which the reactants are in a suitably activated state for condensation. When the half life of the free-radical generating catalyst is greater than 10 hours, radicals are not generated at a sufficient rate to cause the reaction of the process of the present invention to go forward at a practically useful rate. Thus the reaction temperature may be within the range of from about 50° to about 300° C. and at least as high as the decomposition temperature of the catalyst, by which is meant a temperature such that the half life of the free-radical generating catalyst is not greater than 10 hours. Since the half life for each free-radical generating catalyst is different at different temperatures, the exact temperature to be utilized in a particular reaction will vary. However, persons skilled in the art are well acquainted with the half life vs. temperature data for different free-radical generating catalysts. Thus it is within the skill of one familiar with the art to select the particular temperature needed for any particular catalyst. However, the operating temperatures generally do not exceed the decomposition temperature of the catalyst by more than about 100° C. since free-radical generating catalysts decompose rapidly under such conditions. For example, when a free-radical generating catalyst such as t-butyl perbenzoate is used, having a 50% decomposition temperature (in 10 hours) of approximately 105° C., the operating temperature of the process is from about 105° to about 205° C. When di-t-butyl peroxide having a 10 hour, 50% decomposition temperature of about 125° C. is used, the process is run at a temperature ranging from about 125° to about 225° C. Higher reaction temperatures may be employed, but little advantage is gained if the temperature is more than the hereinbefore mentioned 100° C. higher than the 10 hour, 50% decomposition temperature of the catalyst. The general effect of increasing the operating temperature is to accelerate the rate of condensation reaction of the chloromethylcyclohexane with the 1-alkene. However, the increased rate of reaction is accompanied by certain amounts of decomposition. In addition to the elevated temperatures which are utilized, the reaction may also be effected at elevated pressures ranging from about 1 to about 100 atmospheres or more, the preferred operating pressure of the process being that which is required to maintain a substantial portion of the reactants in liquid phase. Pressure is not an important variable in the process of this invention. However, because of the low boiling points of some of the reactants it is necessary to utilize pressure-withstanding equipment to insure liquid phase conditions. In batch type operations, it if often desirable to utilize pressure-withstanding equipment to charge the reactants and the catalyst to the vessel and to pressure the vessel with 10 or 30 or 50 or more atmospheres of an inert gas such as nitrogen. This helps to insure the presence of liquid phase conditions. However, when the mole quantity of reactants is sufficient, the pressure which they themselves generate at the temperature utilized is sufficient to maintain the desired phase conditions.

Furthermore, the concentration of the catalyst employed in this process may vary over a rather wide range but it is desirable to utilize low concentrations of catalysts such as from about 0.1 to about 10% of the total weight of the combined starting materials charged to the process. The reaction time may be within the range of from less than 1 minute to several hours, depending upon temperature and the half life of the catalyst. Generally, contact times of at least 10 minutes are preferred.

In addition to the free-radical generating catalyst, the alkylation is also effected in the presence of a hydrogen chloride compound. The hydrogen chloride compound is used as a promoter for the reaction and also is used to prevent or inhibit telomerization, said telomerization being a polymerization reaction in which unwanted side reaction products may be formed. The hydrogen chloride may be present as anhydrous hydrogen chloride, as concentrated hydrochloric acid or as an aqueous solution of hydrochloric acid, the hydrochloric acid being present in an amount of from 5 to about 38% in said aqueous solution.

The resulting disubstituted cyclohexane comprising an n-alkyl-substituted chloromethylcyclohexane is thereafter reacted with an alkali metal salt of a sulfur-containing compound such as an alkali sulfate or alkali bisulfate to obtain the desired product. Representative examples of these alkali metal salts include sodium sulfate, sodium bisulfate, potassium sulfate, potassium bisulfate, lithium sulfate, lithium bisulfate, rubidium sulfate, rubidium bisulfate, cesium sulfate, cesium bisulfate, etc., the preferred compounds comprising the sodium or potassium salts due to their relatively lower cost and greater availability. The reaction is usually effected at elevated temperatures in the range of from about 50° to about 150° C. or more and at atmospheric pressure. Preferably the sulfation is effected in the presence of a high polar or high dielectric solvent, said solvents including dimethyl sulfoxide, dimethylformamide, sulfolane, dioxane, ethanol, ethylene glycol, glycerol, nitromethane, etc.

The process of this invention in which the novel compositions of matter useful as biodegradable detergents are prepared may be effected in either a batch type or continuous type of operation. When a batch type operation is used, a quantity of the allyl chloride is placed in an appropriate apparatus such as an autoclave and butadiene is charged thereto. The autoclave is then heated to the desired operating temperature and pressure in the range hereinbefore set forth and maintained thereat for a predetermined residence time which may range from about 0.5 up to about 10 hours or more in duration. Upon completion of the desired residence time, heating is discontinued, the autoclave is allowed to return to room temperature, the excess pressure is vented and the reaction mixture is recovered. The 4-chloromethylcyclohexene is separated from any unreacted allyl chloride by conventional means such as distillation or any other separation means known in the art and placed in a second reaction vessel whereby the chloromethylcyclohexene is selectively hydrogenated by passage over a catalyst such as a platinum- or palladiium-containing compound in the presence of a hydrogen stream at a temperature and pressure within the range hereinbefore set forth, the cyclohexene ring being selectively and relatively completely hydrogenated to form a cyclohexane ring.

The chloromethylcyclohexane is then placed in another reaction vessel along with a free-radical generating compound and the 1-alkene which is to be utilized as the alkylating agent, said alkylating vessel preferably comprising an autoclave of the rotating or mixing type. In addition, a promoter comprising hydrogen chloride either in gaseous form as hydrdogen chloride or in aqueous form as hydrochloric acid is added to the reactor which is thereafter heated to the desired operating temperature which, as hereinbefore set forth, is at least as high as the decomposition temperature of the free-radical generating compound. After maintaining the alkylation reaction at this temperature for a predetermined period of time, heating is discontinued, the reaction mixture is allowed to return to room temperature and the alkyl-substituted chloromethylcyclohexane is recovered by conventional means. The n-alkyl chloromethylcyclohexane is reacted with the alkali metal salt of a sulfur-containing compound at elevated temperatures and in the presence of a solvent of the type hereinbefore set forth. Following the sulfation step which may take again from about 0.5 up to about 10 hours or more, heating is discontinued, the desired product is separated from the solvent by fractionation and passed to storage.

It is also contemplated within the scope of this invention that the desired product may be prepared while employing a continuous type of operation. When the continuous type of operation is to be used, the starting materials comprising the allyl chloride and butadiene are continuously charged to a reactor which is maintained at the proper operating conditions of temperature and pressure. After passage through this reactor, the effluent is continuously withdrawn, subjected to a separation step whereby the unreacted allyl chloride and butadiene are separated from the chloromethylcyclohexene and recycled to form a portion of the feed stock while the latter is continously charged to a hydrogenation apparatus along with a stream of hydrogen sufficient to maintain the desired operating pressure. The hydrogen and 4-chloromethylchlohexene are continuously passed over a hydrogenation catalyst of the type hereinbefore set forth at a temperature in the range of from about −25° to about 50° C. and the resulting product is continuously withdrawn. The product which has been selectively and usually relatively completely hydrogenated to form chloromethylcyclohexane is thereafter charged to an alkylation apparatus which is also maintained at the proper operating conditions of temperature and pressure. In addition, the 1-alkene, the free-radical generating compound and the hydrogen chloride promoter are also continuously charged to this alkylation apparatus through separate lines. After completing the desired residence time in the alkylation apparatus, the reactor effluent is continuously withdrawn, again subjected to separation steps whereby unreacted starting materials, promoter and free-radical generating compound are separated from the alkyl-substituted chloromethylcyclohexane. The unreacted materials are recycled to form a portion of the feed stock to the apparatus while the alkyl-substituted chloromethylcyclohexane is continuously charged to a sulfaction reactor. The alkali metal sulfur-containing compound such as sodium bisulfate, etc., is continuously charged to the sulfation reactor along with the solvent. The solvent may be charged to the reactor through a separate line or one or both of the reactants may be admixed with the solvent prior to entry into said reactor and the resulting mixture charged thereto in a single stream. After completion of the desired residence time in the sulfation reactor, the effluent is again continuously withdrawn and subjected to separation steps which are conventional in nature whereby unreacted starting material and solvent are separated from the desired compound, the latter being passed to storage while the unreacted starting materials are recycled to form a portion of the feed stock.

Some specific examples of the novel compositions of matter which may be prepared according to the process hereinbefore set forth will include those compounds having the generic formula:

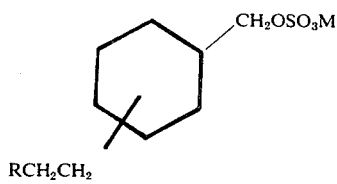

in which M is an alkali metal and R is an alkyl group of from 1 to about 14 carbon atoms such as sodium(n-propylcyclohexyl)methano sulfate, potassium(n-propylcyclohexyl)methano sulfate, lithium(n-propylcyclohexyl)methano sulfate, cesium(n-propylcyclohexyl)methano sulfate, sodium(n-butylcyclohexyl)methano sulfate, potassium (n-butylcyclohexyl)methano sulfate, lithium(n-butylcyclohexyl)methano sulfate, cesium(n-butylcyclohexyl)methano sulfate, sodium(n-pentylcyclohexyl)methano sulfate, potassium(n-pentylcyclohexyl)methano sulfate, lithium(n-pentylcyclohexyl)methano sulfate, cesium(n-pentylcyclohexyl)methano sulfate, sodium(n-hexylcyclohexyl)methano sulfate, potassium(n-hexylcyclohexyl)methano sulfate, lithium(n-hexylcyclohexyl)methano sulfate, cesium(n-hexylcyclohexyl)methano sulfate, sodium(n-heptylcyclohexyl)methano sulfate, potassium(n-heptylcyclohexyl)methano sulfate, lithium(n-heptylcyclohexyl)methano sulfate, cesium(n-heptylcyclohexyl)methano sulfate, sodium(n-octylcyclohexyl)methano sulfate, potassium(n-octylcyclohexyl)methano sulfate, lithium(n-octylcyclohexyl)methano sulfate, cesium(n-octylcyclohexyl)methano sulfate, sodium(n-nonylcyclohexyl)methano sulfate, potassium(n-nonylcyclohexyl)methano sulfate, lithium(n-nonylcyclohexyl)methano sulfate, cesium(n-nonylcyclohexyl)methano sulfate, sodium(n-decylcyclohexyl)methano sulfate, potassium(n-decylcyclohexyl)methano sulfate, lithium(n-decylcyclohexyl)methano sulfate, cesium(n-decylcyclohexyl)-methano sulfate, sodium(n-undecylcyclohexyl)methano sulfate, potassium(-undecylcyclohexyl)methano sulfate, lithium(n-undecylcyclohexyl)methano sulfate, cesium(n-undecylcyclohexyl)methano sulfate, sodium(n-dodecylcyclohexyl)methano sulfate, potassium(n-dodecylcyclohexyl)methano sulfate, lithium(n-dodecylcyclohexyl)methano sulfate, cesium(n-dodecylcyclohexyl)methano sulfate, sodium(n-tetradecylcyclohexyl)methano sulfate, potassium(n-tetradecylcyclohexyl)methano sulfate, lithium(n-tetradecylcyclohexyl)methano sulfate, cesium(n-tetradecylcyclohexyl)methano sulfate, etc. It is to be understood that the aforementioned biodegradable detergents are only representative of the novel class of compounds and that the present invention is not necessarily limited thereto.

The following examples are given to illustrate the novel compounds of the present invention and the process for the preparation thereof; however, these examples are not intended to limit the generally broad scope of the present invention in strict accordance therewith.

EXAMPLE I

In a glass liner of a rotating autoclave is placed 76.5 grams (1.0 mole) of allyl chloride. The liner is then sealed into the autoclave and 54 grams (1.0 mole) of butadiene is charged thereto. The autoclave is heated to a temperature of 125° C. and maintained thereat for a period of 4 hours, at the end of which time heating is discontinued and the autoclave allowed to return to room temperature. The autoclave is opened, the reaction mixture is recovered therefrom and the mixture is subjected to fractional distillation whereby the desired product comprising 4-chloromethylcyclohexene is separated from any unreacted allyl chloride and recovered.

The aforementioned 4-chloromethylcyclohexene which is prepared according to the above paragraph is then placed in another liner of a rotating autoclave along with 1-octene, the chloromethylcyclohexene being present in a molar excess over the 1-octene in a range of from about 1.5:1 to about 2:1 moles of chloromethylcyclohexene per mole of 1-octene. In addition to the two reactants, a catalyst comprising 7 grams of di-t-butyl peroxide and 20 grams of concentrated hydrochloric acid are added to the liner. The liner is then sealed into the autoclave and nitrogen is pressed in until an initial operating pressure of 30 atmospheres is reached. The autoclave and contents thereof are then heated to a temperature of 130° C. and maintained in a range of from about 130° to 140° C. for a period of 8 hours. At the end of the 8-hour period, heating is discontinued, the autoclave is allowed to return to room temperature, the excess pressure is discharged and the autoclave is opened. The reaction mixture is subjected to fractional distillation under reduced pressure whereby the desired n-octyl-3-cyclohexenylmethyl chloride is recovered.

The n-octyl-substituted 3-cyclohexenylmethyl chloride is then charged to a reactor which is loaded with a catalyst comprising platinum composited on granular charcoal. The compound is charged to the reactor at a liquid hourly space velocity of 0.5 along with a stream of hydrogen in an amouint sufficient to maintain a hydrogen pressure of 2000 pounds per square inch, the reactor being maintained at a temperature below about 50° C. After passage over the catalyst, the effluent steam is withdrawn to a separation zone whereby the hydrogen gas is separated from the organic liquid phase.

The n-octyl-substituted chloromethylcyclohexane is then treated with an equimolar amount of sodium sulfate at a temperature of about 60° C. in the presence of a solvent comprising dimethyl sulfoxide for a period of 4 hours. At the end of this time, heating is discontinued, the mixture is recovered and subjected to conventional means of separation whereby the desired product comprising sodium(n-octylcyclohexyl)methano sulfate is separated and recovered.

EXAMPLE II

In this example 4-chloromethylcyclohexene is prepared in a manner similar to that hereinbefore set forth. The thus prepared 4-chloromethylcyclohexene which results from the condensation in a Diels-Alder manner between butadiene and allyl chloride is then charged to a reactor which has been loaded with a hydrogenation catalyst comprising palladium composited on kieselguhr. The 4-chloromethylcyclohexene is charged to the reactor at a temperature of about 40° C., a liquid hourly space velocity of 0.5 along with a stream of hydrogen sufficient to maintain a hydrogen pressure of 2000 pounds per square inch. After passage over the catalyst, the effluent stream is withdrawn to a separation zone whereby the hydrogen gas is separated from the liquid phase. This liquid phase is found to comprise over 90% of the desired product, chloromethylcyclohexane.

The aforementioned chloromethylcyclohexane along with 1-tetradecene, benzoyl peroxide and concentrated hydrochloric acid are placed in an alkylation apparatus and heated to reflux at a temperature in the range of from about 80° to 85° C. for a period of 4 hours. At the end of the 4-hour period, heating is discontinued and the reactor is allowed to return to room temperature. The reaction mixture is recovered, subjected to distillation whereby the desired product comprising n-tetradecyl-substituted chloromethylcyclohexane is recovered. The n-tetradecyl-substituted chloromethylcyclohexane is then reacted with sodium sulfate at a temperature of about 75° C. for a period of 4 hours in the presence of a solvent comprising 1,4-dioxane. At the end of the 4-hour period, heating is discontinued and the reaction mixture is allowed to cool to room temperature. After cooling to room temperature, the mixture is subjected to conventional means of separation whereby the desired product comprising sodium(n-tetradecylcyclohexyl)methano sulfate is recovered.

EXAMPLE III

In a manner similar to that set forth in the above examples, 4-chloromethylcyclohexene which is prepared by the reaction of equimolar quantities of allyl chloride and butadiene at a temperature of 125° C. is selectively hydrogenated by passage over a hydrogenation catalyst comprising platinum composited on kieselguhr, the hydrogenation conditions including a temperature of about 40° C., a liquid hourly space velocity of 0.5 and an applied hydrogen pressure of 2000 pounds per square inch. The desired product comprising chloromethylcyclohexane is separated from the hydrogen gas and alkylated by being placed in a glass liner of a rotating autoclave along with 1-dodecene, di-t-butyl peroxide and hydrochloric acid, said chloromethylcyclohexane being present in a molar excess. After alkylating at conditions which include a temperature in the range of from 130° to 140° C. and a pressure of 30 atmospheres of nitrogen for a period of 4 hours, heating is discontinued, the autoclave is allowed to return to room temperature and the excess pressure is discharged. The autoclave is opened and the reaction mixture which is recovered therefrom is subjected to fractional distillation under reduced pressure to separate and recover n-dodecyl-substituted cyclohexylmethyl chloride.

The aforementioned compound is sulfated by treating the compound with an equimolar amount of potassium bisulfate in the presence of a dimethyl sulfoxide solvent, said reaction being effected at a temperature of 50° C. for a period of 4 hours. At the end of the aforementioned 4-hour period, heating is discontinued and upon cooling, the reaction mixture is separated from the solvent and any unreacted starting materials, the desired product comprising potassium(n-dodecylcyclohexyl)methano sulfate being recovered therefrom.

EXAMPLE IV

In like manner, 76.5 grams (1.0 mole) of allyl chloride is placed in the glass liner of a rotating autoclave which is sealed into said autoclave and 54 grams (1.0 mole) of butadiene is charged thereto. The autoclave is then heated to a temperature of 125° C. and maintained thereat for a period of 8 hours. At the end of the 8-hour period, heating is discontinued and the autoclave is allowed to return to room temperature. The autoclave is opened, the reaction mixture is recovered therefrom and subjected to fractional distillation under reduced pressure whereby the desired product comprising 4-chloromethylcyclohexene is separated from any unreacted allyl chloride and recovered. Following this, the recovered 4-chloromethylcyclohexene is charged to a reactor which is maintained at a temperature of about 50° C. and which congains a hydrogenation catalyst comprising platinum composited on kieselguhr. The chloromethylcyclohexene is hydrogenated under conditions which include a liquid hourly space velocity of 0.5 and a hydrogen charge sufficient to maintain a pressure of 1000 pounds per square inch. After passage through the reactor, the effluent stream is withdrawn to a separation zone whereby the hydrogen gas is separated from the organic liquid phase. Thereafter the resultant chloromethylcyclohexane is placed in the glass liner of a rotating autoclave along with 1-hexadecene, the charge stock consisting of a molar excess of the chloromethylcyclohexane over the 1-hexadecene in a range of from about 1.5:1 to about 2:1 moles of chloromethylcyclohexane per mole of 1-hexadecene. In addition to the reactants 7 grams of benzoyl peroxide and 20 grams of concentrated hydrochloric acid are also added to the autoclave. The autoclave is then sealed and nitrogen is pressed in until an initial operating pressure of 30 atmospheres is reached. The autoclave and contents thereof are then heated to a temperature of about 80° C. and maintained in a range of from about 80° to 85° C. for a period of about 8 hours. At the end of the 8-hour period, heating is discontinued, the autoclave is allowed to return to room temperature and the excess pressure is discharged therefrom. After the autoclave is opened, the reaction mixture is recovered, subjected to fractional distillation under reduced pressure whereby the desired product comprising n-hexadecyl-substituted cyclohexylmethyl chloride is recovered.

The n-hexadecyl-substituted cyclohexylmethyl chloride is then sulfated by placing the compound in a flask along with an equimolar amount of potassium sulfate, the reaction being effected in the presence of a solvent comprising dioxane. The flask is heated to a temperature of about 50° C. and maintained thereat for a period of 4 hours, at the end of which time heating is discontinued. After the vessel and contents thereof have returned to room temperature the reaction mixture is subjected to conventional separation means whereby the desired product comprising potassium(n-hexadecylcyclohexyl)methano sulfate is separated from the solvent and any unreacted starting materials and recovered.

EXAMPLE V

In this example 4-chloromethylcyclohexene is prepared in a manner similar to that set forth in the above examples by reacting equimolar proportions of allyl chloride and butadiene at a temperature of about 125° C. and a pressure of 30 atmospheres of nitrogen for a period of 4 hours. At the end of the predetermined residence time, the reaction mixture is subjected to conventional means of separation such as fractional distillation whereby the 4-chloromethylcyclohexene is separated from any unreacted allyl chloride and recovered. This product is then subjected to selective hydrogenation by passage through a reactor containing a hydrogenation catalyst comprising palladium composited on kieselguhr, the hydrogenation conditions including a temperature of about 40° C., a liquid hourly space velocity of 0.5 and a hydrogen charge which is sufficient to maintain a pressure of about 2000 pounds per square inch. After passage through the reactor, the effluent stream is withdrawn and passed to a separation zone whereby the hydrogen gas is separated from the liquid phase.

The product from the hydrogenation step which comprises chloromethylcyclohexane is then placed in the glass liner of a rotating autoclave along with 1-decene, a catalyst comprising di-t-butyl peroxide and a promoter comprising aqueous hydrogen chloride, the cyclohexane being present in a molar excess over the 1-decene. The liner is sealed into the autoclave and nitrogen is pressed in until an initial operating pressure of 30 atmospheres is reached, after which the autoclave is heated to a temperature of 130° C. and maintained in a range of from 130° to 140° C. for a period of 8 hours. Upon completion of the 8-hour period, heating is discontinued, the autoclave is allowed to return to room temperature and the excess pressure is discharged. After opening the autoclave, the reaction mixture is recovered and subjected to fractional distillation whereby the n-decyl-substituted cyclohexylmethyl chloride is separated from unreacted starting materials and recovered. This product is then reacted with an equimolar amount of sodium sulfate at a temperature of about 75° C. for a period of 4 hours in the presence of a solvent comprising 1,4-dioxane. At the end of the 4-hour period heating is discontinued and the reaction mixture is allowed to cool to room temperature. After cooling to room temperature, the mixture is subjected to conventional means of separation whereby the desired product comprising sodium(n-decylcyclohexyl)-methano sulfate is recovered.

I claim as my invention:

1. A novel biodegradable detergent having the formula:

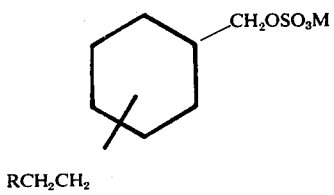

in which M is an alkali metal and R is an alkyl group of from 1 to about 14 carbon atoms.

2. The biodegradable detergent of claim 1 being sodium(n-octylcyclohexyl)methano sulfate.

3. The biodegradable detergent of claim 1 being potassium(n-dodecylcyclohexyl)methano sulfate.

4. The biodegradable detergent of claim 1 being potassium(n-hexadecylcyclohexyl)methano sulfate.

5. The biodegradable detergent of claim 1 being sodium(n-decylcyclohexyl)methano sulfate.

6. The biodegradable detergent of claim 1 being sodium(n-tetradecylcyclohexyl)methano sulfate.

* * * * *